W. STENDER.
HEAD MOLD FOR BOTTLE MAKING MACHINES.
APPLICATION FILED APR. 2, 1917.
1,259,800. Patented Mar. 19, 1918.
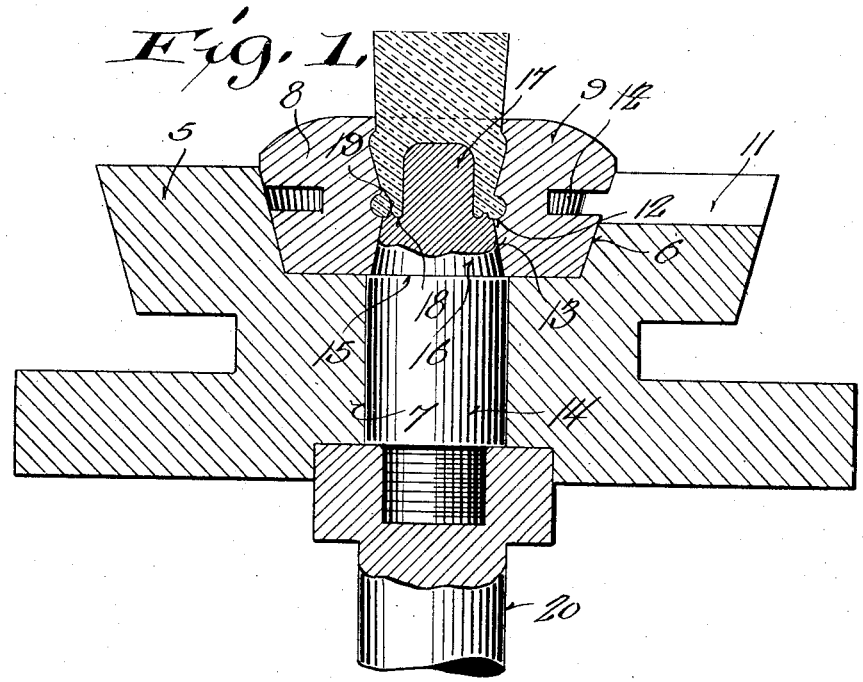
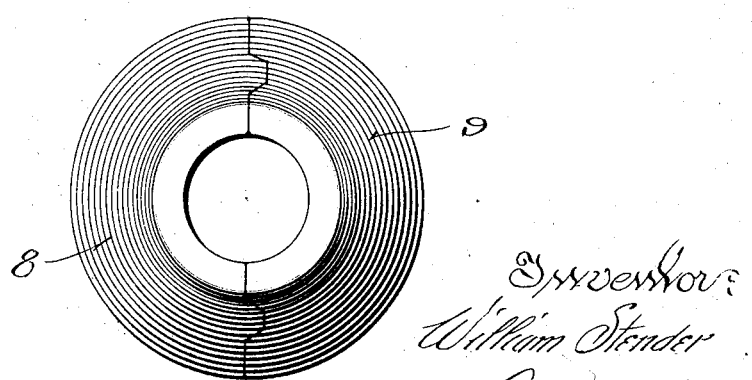

UNITED STATES PATENT OFFICE.

WILLIAM STENDER, OF MILWAUKEE, WISCONSIN, ASSIGNOR, BY DIRECT AND MESNE ASSIGNMENTS, TO KNOX PATENTS COMPANY, INC., OF AUDUBON PARK, LOUISVILLE, KENTUCKY.

HEAD-MOLD FOR BOTTLE-MAKING MACHINES.

1,259,800.             Specification of Letters Patent.        Patented Mar. 19, 1918.

Application filed April 2, 1917. Serial No. 159,053.

*To all whom it may concern:*

Be it known that I, WILLIAM STENDER, a citizen of the United States, and resident of Milwaukee, in the county of Milwaukee and State of Wisconsin, have invented certain new and useful Improvements in Head-Molds for Bottle-Making Machines; and I do hereby declare that the following is a full, clear, and exact description thereof.

My invention relates to new and useful improvements in bottle making machinery and is directed more particularly to the provision of head molds for forming the neck mouths of the bottles preliminary to the blowing operation thereof. Such head molds are usually formed in sections, and a considerable disadvantage heretofore encountered in such sectional molds is due to a slight spreading of the mold sections upon application of pressure incidental to the molding operation, whereby objectionable side seams are formed due to the molten glass entering the space between the mold sections. Also, a circular seam is formed at the juncture of the plunger and mold which is liable to cut the cork of the sealing cap and to also cut the brushes used in cleaning the bottles after they are made.

It is primarily the object of my invention to prevent the formation of such undesired seams on a bottle neck and more particularly it is an object to provide an arrangement whereby the sections of the head mold are urged together upon molding pressure being applied thereto, and whereby a proper tightness of the forming plunger is assured upon entering the head mold to thus provide an entirely smooth molding surface.

A still further object resides in the provision of an arrangement for effecting a smooth mold surface which does not interfere in any manner with the normally convenient operation of the head mold and associated parts.

A still further object resides in the provision of means for forming an annular groove in the mouth edge of the bottle neck whereby to form a double contact arrangement adapted to engage the sealing cap more particularly in the manner shown in Patent No. 1,191,194 granted to Geo. F. Knox July 18, 1916.

With the above and other objects and advantages in view, the invention resides more particularly in the novel combination, formation and arrangement of parts hereinafter described and pointed out in the appended claims.

In the drawings:—

Figure 1 is a vertical sectional view through my improved sectional head mold and associated parts including the forming plunger, which is shown in its inward limit of forming movement.

Fig. 2 is a top plan view of the mold.

Referring now more particularly to the accompanying drawings, 5 designates the usual block for holding the head mold in a bottle making machine, and in embodying my invention this block is provided with a mold receiving recess 6 of inverted frusto-conical shape and is further provided with a plunger receiving bore 7 communicating with the bottom of the recess 6 and concentric therewith.

The mold comprises a pair of semi-circular sections 8 and 9 respectively, and these sections when placed together are frusto-conical in shape to fit within the recess of the block and contact with the side walls thereof in such manner that upon application of molding pressure to the mold sections, they will be forced together to positively prevent the occurrence of seams at the juncture of their end portions which might permit the formation of projections on the bottle neck. These mold sections are provided with the usual circumscribing grooves 10 in their sides to permit removal thereof by means of a suitable tool inserted in a laterally extending passage 11 in the block 5.

The inner faces of the mold sections are formed at their upper portions to define the desired contour of the bottle neck, being suitably inset to define a ledge or shoulder 12 extending at right angles to the axis of the mold whereby to form the outer portion of the annular end face of the bottle neck. Below this shoulder 12 the inner mold faces are taperingly inclined outwardly and coact to form a frusto-conical recess 13. 14 designates the plunger of the mold, which is slidable in the bore 7 of the block, and the inner end of this plunger is provided with an annular shoulder 15 adapted to abut the inner faces of the head mold and is further provided with a frusto-conical section 16 adapted to engage in the frusto-conical recess 13 of the head mold. This plunger terminates in a reduced extension 17 projecting into the upper portion of the mold to force the molten glass thereagainst and at the juncture of the section 17 and the frusto-conical section 16 is formed a shoulder 18 adapted to form the inner portion of the end face of the bottle neck. This shoulder is intermediately provided with an annular rib 19 which serves to divide the end face of the bottle neck into concentric contact portions adapted to procure a maximum sealing coaction with the usual closure caps.

The shoulder 15 of the plunger limits inward movement thereof with respect to the mold to thus insure proper alinement of the shoulders 12 and 18.

It is appreciated that the major pressure incidental to the molding operation is applied to the head mold sections 8 and 9 to insure their wedging contact incidental to the bevel afforded by their frusto-conical shape in conjunction with the corresponding formation of the receiving recess 6.

What is claimed:—

1. In a bottle making machine, a centrally apertured two-part head mold, one end portion of said aperture being shaped to define the contour of a bottle neck and inset to define a shoulder for forming the outer portion of the end face of the neck, the other end portion of said aperture being of substantially frusto-conical shape, the taper of said other end portion being rearwardly and outwardly inclined, a forming plunger insertible into said aperture from said other end and including a frusto-conical portion engageable with the shoulder of the mold to define the inner portion of the end face of the bottle neck, a second annular shoulder on said plunger outwardly of the first named shoulder and adapted to abut the end of the head mold, and an annular rib on said annular shoulder of the plunger intermediate its edges whereby to define a groove dividing the end face of a bottle neck into outer and inner concentric portions, substantially as described.

2. In a bottle making machine, the combination with a holding block provided with a central frusto-conical recess, the peripheral wall of which tapers inwardly and a bore communicating with the bottom of the recess and concentric therewith, of a plurality of mold sections coacting to form an annular mold member, the outer peripheral edges of said sections being inclined and curved to form a frusto-conical shape when assembled whereby to procure wedging abutment of their adjacent end portions when inserted in the frusto-conical recess of the said block, and the upper outer face of the assembled mold extending beyond the surface of the holding block whereby to procure the positive forcing together of the adjacent edges of the mold sections upon application thereagainst of molding pressure to prevent the occurrence of seams at the juncture of their end portions, substantially as described.

3. A bottle making machine comprising, in combination, a holding block provided with a frusto-conical recess and a bore communicating with the bottom of the recess and concentric therewith, the peripheral wall of said recess being inwardly inclined, a pair of semi-circular mold sections co-acting to form an annular mold member having a passage therethrough, one end portion of said passage being formed to define the contour of a bottle neck, the other end portion of the passage being of substantially frusto-conical shape and in alinement with the bore of said holding block, the outer peripheral edges of said sections being inclined and curved to form a frusto-conical shape when assembled whereby to procure wedging abutment of their adjacent end portions when inserted in the frusto-conical recess of the said block and the upper outer surface of the assembled mold being extended beyond the surface of the holding block whereby to procure the forcing together of the adjacent edges of the mold sections upon the application thereagainst of molding pressure to prevent the occurrence of seams at the juncture of the end portions, and a forming plunger insertible into the bore of said holding block from the end opposite the frusto-conical recess and including a frusto-conical section engageable with said frusto-conical portions of the passage in the mold member, substantially as described.

In testimony that I claim the foregoing I have hereunto set my hand at Milwaukee, in the county of Milwaukee and State of Wisconsin, in the presence of two witnesses.

WILLIAM STENDER.

Witnesses:
 FRANK S. RATCLIFFE,
 M. E. DOWNEY.

Copies of this patent may be obtained for five cents each, by addressing the "Commissioner of Patents, Washington, D. C."